March 14, 1961 W. J. LEAHY ET AL 2,974,764
INDUSTRIAL TRUCK BRAKING SYSTEM
Filed April 1, 1958 2 Sheets-Sheet 1
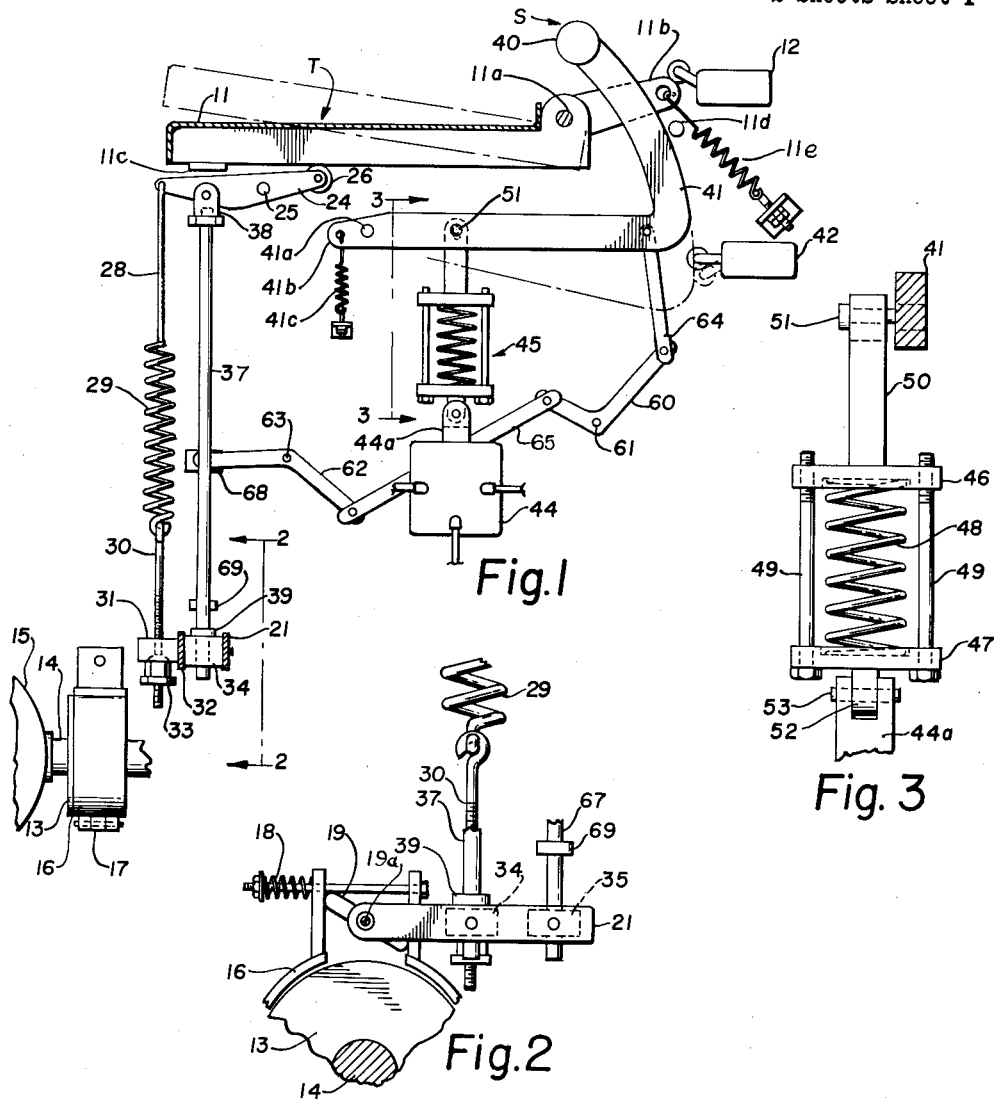
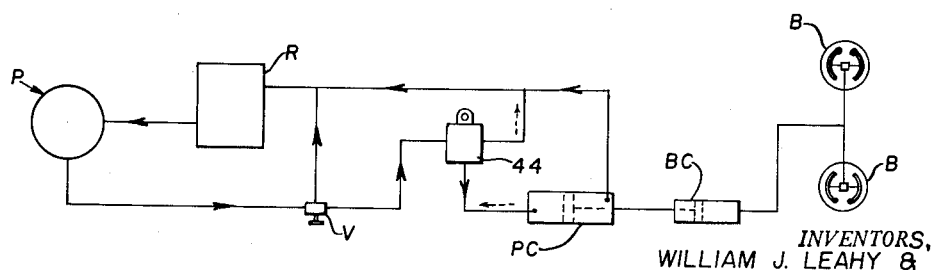
INVENTORS,
WILLIAM J. LEAHY &
JOHN A. DRAXLER
BY
Golrick & Golrick
Atty's.

2,974,764
Patented Mar. 14, 1961

United States Patent Office

2,974,764
INDUSTRIAL TRUCK BRAKING SYSTEM

William J. Leahy, Chicago, Ill., and John A. Draxler, Berea, Ohio, assignors to The Elwell-Parker Electric Company, Cleveland, Ohio, a corporation of Ohio Filed Apr. 1, 1958, Ser. No. 725,705

7 Claims. (Cl. 192—2)

The present invention is concerned with braking systems for industrial trucks, more particularly with systems for heavy trucks wherein wheel braking is required.

In industrial trucks intended for handling quite heavy loads on the order of several tons, because of the large mass involved not only in the contemplated loading but also in the requisite vehicle itself, particular problems arise with respect to the braking systems. Thus are found unsuitable those mechanical service brakes commonly used in many smaller industrial trucks of relatively light capacity, wherein braking force is applied to a brake drum carried on a motor shaft or similar drive shaft element for transmission torque-wise usually through a reduction gearing system to the vehicle wheels. Such mechanical brakes when incorporated in the heavy vehicles here of concern suffer firstly, in limitations of effective service braking attainable in practically acceptable purely mechanical brakes of the type described, and secondly in the wear and required maintenance of the drive mechanism, particularly gearing, where the latter is designed as economically it should be, primarily from consideration of propulsion requirements.

In the larger industrial trucks, power wheel braking of the hydraulic type has come into use, where the power unit itself is a hydraulically actuated cylinder operating the master cylinder of a hydraulic brake system and effecting force multiplication in order to minimize pressure, and accordingly strength requirements, in the primary hydraulic power system. However, in the power type wheel braking system for heavy vehicles it has been found that rather rapid wear occurs in the brake shoes at the wheels requiring continual maintenance for adjustment or replacement.

It is further desirable, even necessary from viewpoint of safety and safety requirements, that a parking brake and an emergency brake of the "dead-man" control type be provided in the vehicle. Conveniently, the emergency or "dead-man" control type brake and the parking brake function have been incorporated in a single system or mechanism wherein depression of a treadle or platform of the operator's station by the weight of the operator in driving position serves to release a mechanical brake of the above noted type and also to cut off propulsion power, while application of the brake is permitted under an internal bias of the system where the operator moves from normal driving position. Thus such mechanical brake serves as a parking brake where the operator has intentionally stopped and left the vehicle, and as an emergency or "dead-man" control type brake upon other events removing the operator.

In trucks of the prior art, generally speaking, it has been found that in the event of a service brake failure the manner of control, independent control, of other braking means available, for example, the parking or "dead-man" type mechanical brake, is such that the operator cannot be relied upon to think quickly enough to utilize effectively such other braking means. On the other hand, where such mechanical brakes should be applied upon failure of the service brakes, there arises possibility of dangerous load shifting or loss by the sudden deceleration consequent upon inability of the operator to control the rate of brake application.

As the broader object of the present invention it is proposed to provide an inter-relation of the control and actuation means of a mechanical parking and "dead-man" type brake of the above mentioned type and of a service power brake, whereby the said mechanical brake is under the direct, immediate control of the operator and readily available in function through the service brake control element or pedal, so that in the event of service brake failure only a further extended and more vigorous effort in the operator's physical movement for normal braking, natural in an emergency situation, brings the mechanical parking or emergency brake into play.

Now in the case of electrically powered industrial trucks, it is further proposed to utilize dynamic electrical braking, per se known to the electrical motor arts, concurrently with or successively cumulatively with power hydraulic braking. The controls for the dynamic braking are subject to actuation by the same driver operated control pedal for, and inter-related with the controls of, the power brake system as hereinafter fully described. An object and advantage of this arrangement is that wear on the power wheel brake system is diminished, and consequent maintenance; and also in the control system proposed for the braking system, that the dynamic braking action is present to aid mechanical braking in the event of power brake failure.

By the present invention, in an electrically driven industrial truck, a single service breaking control element, such as a service brake pedal, is so interlinked mechanically and electrically with the hydraulic power braking system, the "dead-man" emergency and parking brake, and the dynamic braking system, that dynamic braking, power braking and mechanical emergency type braking are successfully and cumulatively available upon continued or progressive depression of the service brake pedal. The dynamic braking preferably is available in the progressive control sequence before power braking occurs but nonetheless may be advantageously used to begin simultaneously with the power braking. Further, the control system is such that over a certain range of brake pedal movement the intensity or extent of power braking increases.

Thus the present invention contemplates provision of an over-all braking system and controls therefor whereby all braking functions are available at a single service brake control or pedal so that upon failure, say of the power brake or even dynamic brake, the same control element or control motion may be continued to achieve an ultimately appearing emergency braking function. Further, by the inclusion of the dynamic braking, since less hydraulic braking force is normally required to achieve the desired rapidity of braking action, not only are problems of wear and maintenance in the power brake system ameliorated, but also in consequence of the use of lower hydraulic forces there is attained a smoother braking, minimizing the likelihood of brake grabbing with its usually attendant dangerous possibility of load shifting. Also in the case of power brake failure, dynamic braking reduces the brake force application required on the drive shaft by the emergency mechanical brake, and consequently reduces the otherwise large torsional stresses and wear in the drive system gear train.

An additional advantage of the disclosed interlinkage of the mechanical emergency brake with the service brake pedal is a resultant control of the degree of mechanical braking effort through operator effort applied at the control pedal. This is of particular merit in contrast with the usual "dead-man" control type brake, wherein control of the degree of braking when used as a voluntary braking system is difficult, with the consequence that upon service brake failure and attempt to use the emergency brake, there is great likelihood of instantaneous application of full braking force with its attendant dangers.

In addition to the aforestated objects and advantages of this invention others will appear from the following description and the drawings wherein:

Fig. 1 shows an arrangement of a "dead-man" type mechanical emergency and parking brake, a service brake pedal linkage to the mechanical brake, and mechanical connections of the service brake pedal with the control valve of a power braking system and certain electrical components involved in the dynamic braking system control;

Fig. 2 is a fragmentary detail taken as indicated at 2—2 in Fig. 1;

Fig. 3 is a detail of a linkage element between the service brake pedal and the power braking hydraulic control valve of Fig. 1;

Fig. 4 is a simplified schematic outline of the hydraulic power braking system.

Figure 5:
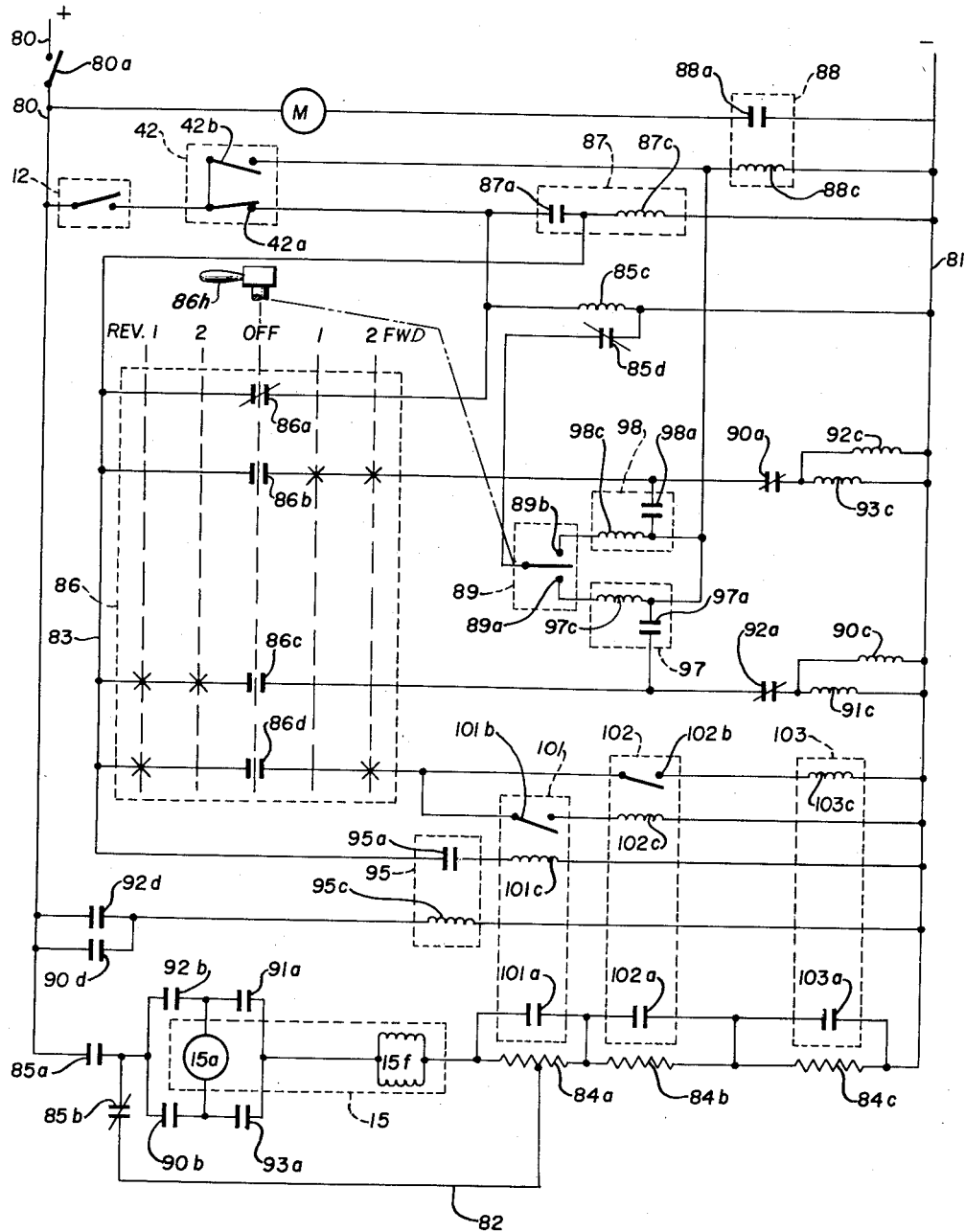
Fig. 5 is a simplified schematic diagram of appropriate circuitry for the electrical controls in the disclosed form of braking system of this invention in conjunction with a known form of vehicle direction and speed control.

In Figs. 1–3 the mechanical elements involved in the over-all braking and integrated braking control system of one form of this invention are shown but for the sake of clarity surrounding parts of the chassis or other environment in the vehicle are omitted.

In the particular arrangement here shown, a treadle structure T, for a "dead-man" control type emergency and parking mechanical brake, includes as floor surface of the operator's station of the vehicle, a platform 11 pivotally secured at its forward edge by a shaft or pivots 11a to the frame of the vehicle. A fixed portion of the frame 11c beneath the platform may serve as a stop for downward platform motion. To an arm element 11b, rigid with the platform and projecting forward of pivot 11a, there is secured one end of a tension spring 11e with its other end anchored to the vehicle frame, which normally tends to raise the platform to a position limited by a stop 11d encountered by 11b. The parking brake actuated switch 12, is mounted with its actuating arm adjacent the path of an arm 11b, to be closed when the treadle is depressed as by the operator's weight, and otherwise opened with the treadle raised to cut off electric power to the drive motor or motors as will be described relative to Fig. 5.

The mechanical brake device is shown in the drawings more or less schematically, since well known in the brake art and is represented as for a disengaged brake condition. A brake drum 13 is secured to the drive or armature shaft 14 from an electric vehicle propulsion motor 15, and opposed pairs of external braking shoes 16 approximately semicircular in form are pivotally secured at 17 to each other and to the vehicle frame. The other ends of the shoes are drawn together through apt means biasing the brake to engaged condition, such as a bolt passed through shoe flanges and a heavy prestressed compression spring interposed between one flange and the bolt or adjusting nut thereon as at 18. Cam means 19 located between the flanges of the brake bands serve upon rotation to one position to force the shoes apart against spring bias and thereby release the brake drum as shown in Fig. 2; and with clockwise rotation, to a second position to permit the shoes to approach each other under the force of the spring at 18 to engage the brake. The cam 19 is supported for rotation on and fixed to shaft means 19a journalled in suitable brackets (not shown) fixed to the frame or other parts of the vehicle environment, the cam being rotated by a lever 21 with one end secured thereto or to said shaft.

To communicate motion of the platform 11 to the mechanical brake, a resilient linkage is provided including a lever or rocker arm 24 pivotally mounted to some fixed frame element beneath the treadle by the pivot shaft 25, the rocker arm carrying at one end a roller 26 engaging a bottom surface of the platform. The extreme opposite end of the rocker arm 24 is connected to lever 21 by a generally vertical rod 28, the tension spring 29 and eye bolt 30 through the lateral lug 31 on the brake lever 21, the eye bolt and its adjusting and lock nuts 32. 33 beneath lug 31 providing for adjustment of spring tension. As may be seen from Figs. 1 and 2, the lever 21 is comprised of a pair of rigidly spaced arms or plates for accommodation therebetween of the pivotally mounted pair of swivel slide blocks 34 and 35 with pivot axes parallel to the brake cam shaft. A generally vertical rod 37, secured through an adjustable clevis connection 38 at its upper end to the lever 24 at a point between pivot 25 and rod 28, has its lower end slideably engaged in the swivel block 34, and carries a rigidly fixed stop collar 39 limiting the spring urged approach of lever 21 toward rocker arm 24. The resulting resilient connection between brake lever 21 and rocker arm 24 thus permits the lever 21 to be depressed, from position of Fig. 2, for brake engagement even though an operator is on treadle T as hereinafter described. However, the complete parking brake or "dead-man" control function is apparent from the structure thus far detailed, whereby depression of treadle structure T by the operator releases the brake and actuates switch 12 to ready the electric circuits for travel; and release of the treadle to the upward position shown in dashed outline causes the parking brake mechanism to engage, and switch 12 to cut off power in the circuits, when the operator leaves the driving station of the vehicle.

The service brake pedal structure S includes a foot bar 40, extending cross the front of the operator's station at a locus above the front end of platform 11 and rigidly secured to a plurality of support arms clearing other fixed structures in pedal depression, such as arms 41 curving forwardly down in front of and then extending back under the treadle to pivots 41a mounting the service brake pedal to fixed elements of the vehicle frame. To the arm portion 41b projecting rearwardly of pivot 41a, there is connected one end of a tension spring 41c of which the other end is anchored to a fixed part of the vehicle to serve as a brake pedal return spring. The apex or front end of an arm 41 serves cam-wise to actuate a service brake pedal switch unit 42 mounted with its actuating lever disposed to be encountered by said apex, for purposes later detailed.

Forward of the pivot 41a the straight portion of one of the arms 41 is linked at 45 to a power brake control valve 44 of a plunger type fixed to the vehicle frame. Valve 44, later described relative to the hydraulically powered service brakes, includes the operating plunger 44a which is returned by an internal spring to an outwardly extended valve closed position. The resilient lost motion linkage 45 between the service brake pedal and valve 44, best seen in Fig. 3, comprises upper and lower plates 46, 47 with opposed faces recessed to receive the ends of an interposed prestressed compression spring 48, and a pair of bolts 49 threaded into upper plate 46 and slideably engaged in the opposite ends of the lower plate 47. The upwardly extending central lug 50 of upper plate 46 is secured to the arm member 41 of the service brake pedal by a suitable pivot element or bolt 51 in a pin-and-slot type lost motion connection. A lug 52 on the bottom plate 47 is likewise pivotally secured to the valve plunger 44a by a pivot pin 53. Since the plunger 44a of the valve 44 is spring returned from inward open positions, the strength of spring 48 is chosen somewhat greater than that of the valve spring.

There is further provided a linkage between the service brake pedal S and the lever 21 for actuation or application of the previously described mechanical emergency or parking braking quite independently of the treadle 11. This linkage, by way of example, may comprise a bell crank 60 pivotally supported on a fixed frame element under the forward region of the arm 41 by a pivot 61; a link element 64 pivotally connected to arm 41 and one arm of crank 60; a second bell crank 62 in like manner pivotally supported on the frame above lever 21 by pivot 63; link element 65, preferably adjustable in length, with ends pivotally connected to the rear arm of crank 60 and front arm of 62; and a rod 67, guided for movement without binding, generally vertical and parallel to rod 37, having its upper end pivotally connected at 68 to the rear arm of crank 62 and its lower end, beneath stop collar 69 affixed thereon, slideably engaged in the swivel block 35 of lever 21. The dimensions of the mechanical elements are of course so chosen that when the parking brake is in disengaged condition, depression of the service brake pedal first moves the plunger 44a to full valve-open position, and only thereafter does the downwardly moved collar 69 encounter block 35 to depress lever 21 and permit mechanical brake engagement.

A simplified schematic hydraulic system for hydraulically powered hydraulic wheel service brakes is shown in Fig. 4, comprising a pump P drawing hydraulic fluid from reservoir R and supplying the same under pressure through pressure relief valve V and plunger type brake control valve 44 to a single acting hydraulic power motor cylinder unit PC with an internal spring returned piston. Valve V, the non-pressurized end of cylinder PC and the exhaust port of valve 44 have fluid return or vent lines to the reservoir R. The valve 44 has a spring returned plunger, normally closing the valve to fluid from the pump and putting the controlled port thereof, which is connected to PC, into free communication with the exhaust port for exhaust of fluid from PC to the reservoir; and upon depression of the plunger 44a putting the inlet port, connected to the pump, into progressively freer communication with the controller port for application of greater fluid pressure in PC. For force multiplication, the piston in PC has a greater area than the piston of the master brake cylinder BC to which it is directly connected by a piston rod. The master cylinder BC is connected by the usual hydraulic lines to the cylinders of the individual wheel brakes B, B. As the structure, over-all arrangement in the vehicle, and requirements of components in the hydraulic systems are known to the art and per se no part of this invention, no further details thereon will be here discussed.

In Fig. 5, there is shown a simplified schematic circuit diagram for a battery electrically driven truck in which the present invention is incorporated. Lines 80, 81 represent main power leads from positive and negative terminals respectively on a truck battery, with conveniently located manual emergency switch 80a (considered closed in all further discussion) included in line 80 before all other elements.

The vehicle drive motor 15 is a series motor represented in Fig. 5 by armature 15a and field 15f, the power circuit of which includes the travel accelerating resistors 84a, 84b, 84c between line 81 and the field; the power switch 85a; and various solenoidally operated switch means whereby the polarity of the armature relative to the field and switch 85a may be changed to obtain forward and reverse vehicle drive, and whereby resistors 84a–c between field and line 81 may be shorted out for acceleration, as hereinafter described, through manual operation and setting of main travel controller 86 by such means as an operating handle 86h. For a truck where a simultaneously operating plurality of propulsion motors are used, 15f will represent parallel connected fields and 15a series connected armatures of such motors. A dynamic braking circuit, including armature, field and a motor shunting load resistance, is provided by line 82 connected from a center or intermediate tap of resistor 84a, through shunting switch 85b to the armature side of 85a.

Between line 80 and line 81 there are successively connected in series a normally open parking brake switch 12, the normally closed switch 42a of the hydraulic service brake switch unit 42, and the normally open contacts 87a and solenoid coil 87c of a relay 87. The normally open switch 42b, commonly connected with 42a to switch 12, is connected in series with coil 88c of a relay 88 to line 81, the relay having normally open contacts 88a in series with motor M of hydraulic power brake pump P between lines 80, 81 for power brake pump operation. It may be here noted that switch 12 is open and closed respectively when the treadle 11 is up and down; and that 42a is closed and 42b open when the service brake pedal is released or not depressed, but are respectively opened and closed upon initial downward movement of the pedal.

The aforementioned switches 85a and 85b are respectively normally open and closed contact pairs of a solenoidally operated contactor unit, including also normally closed contacts 85d, and having operating solenoid 85c connected between line 81 and a point between 42a and 87a.

A two point selector switch 89 is mechanically linked with travel controller 86, so that when the latter is at "off" position, switch 86 is open or at a neutral position, but with controller 86 at forward or reverse setting the selector switch is set to contacts 89a or 89b respectively.

In the master controller 86, the normally closed switch 86a, in parallel with relay contacts 87a, is closed only at neutral or "off" position; the normally open forward direction switch 86b is closed at both first or second forward speed settings; normally open reverse direction switch 86c is closed at both first and second reverse speed settings; and normally open switch 86d is closed at either forward or reverse second speed settings, the closed condition of each switch for each setting being indicated by an "X" at the dashed vertical line indicating each setting.

The left side of each switch in 86 is connected by line 83 to a point between coil and contacts of relay 87. In a forward direction control circuit branch, the other side of switch 86b is connected through normally closed contacts 90a of a reverse drive contactor unit to the parallel forward drive solenoid coils 92c, 93c in turn connected to line 81. The solenoid 92c is part of a forward contactor unit including normally closed contacts 92a in the reverse control branch; normally open contacts 92b connected between a first one end of the armature and common connection of 85a, 85b; and normally open contacts 92d. The solenoid 93c is part of a second forward contactor unit with normally open contacts 93a between the second end of the armature and the field. The reverse direction control branch analogously to the forward branch, includes 86c, the aforementioned normally closed contacts 92a, and the parallel solenoids 90c, 91c of first and second reverse control contactor units. However, the normally open contacts 90b of solenoid 90c are connected to the same end of armature 15a as 93a, and to 85a, 85b; while normally open contacts 91a of solenoid 91c are connected to field 15f and the same end of the armature as 92b.

Although further details of acceleration and speed control are not per se part of this invention, a simplified showing of a known system is briefly described.

Solenoid 90c also has normally open contacts 90d in parallel with 92d, the pair being connected in series with one coil 95c of a plugging relay 95 having a second coil (not shown) with field opposed to the first connected from 90d, 92d to the armature side of field 15f, the function of which omitted element is not here of concern. The contacts 95a of relay 95 however are connected in series with the solenoid 101c of relay 101, between lines 81 and 83; the contactor unit 101 having normally open shunting contacts 101a across resistor 84a, and normally open time delay contacts 101b. Connected successively in series from line 83 to 81 are controller switch 86d, contacts 101b, and the solenoid 102c of a contactor unit 102, having normally open shunting contacts 102a across resistor 84b and normally open time delay contacts 102b. Contacts 102b and the solenoid 103c of contactor unit 103 are connected in series with each other as a circuit branch in parallel with 101b and 102c, the normally open shunting contacts 103a of 103 being connected across resistor 84c.

Thus, initially upon closure of the motor power circuit with either polarity of the motor, all three resistors are in the circuit for low speed at controller setting 1, but closure of 90d or 92d energizes and closes 95 relay, energizing 101 to shunt out 84a for further acceleration; however 84b and 84c cannot be shunted out unless the controller 86 is at second speed setting of forward or reverse. In either of the latter two settings 86d is closed, hence closure of 101b energizes 102 to shunt out 84b, causes delayed closure of 102b for a subsequent energization of 103 and thereupon shunting out the last resistor 84c as well for full acceleration.

Considering direction control as thus far set forth, and assuming parking brake switch 12 closed, and service brake released and all brakes off, therefore 42a closed, 42b open, with 86 at "off" position, 86a is closed, 87c energized and 87a closed and thereafter held closed irrespective of 86a, and hence power is available to the control circuits; until either 12 is opened by release of treadle T, or 42a is opened by use of the service brake pedal for braking. Likewise 85c is energized, closing 85a to make power available to the drive motor, 85b is opened to open the dynamic braking circuit, and 85d is also held open; and such conditions are maintained until 12 or 42a is opened. Use of relay 87 with 86a in parallel with 87a opens all control circuits involving line 83, upon opening of 12 or 42a in any braking function, which circuits cannot again be energized until controller 86 is returned to "off" position to close 86a. This prevents resumption of vehicle propulsion upon closure again of 12 and 42a with the controller yet at a forward or reverse setting.

Hence when the controller is set to first or second forward speed settings, 92c and 93c are energized, closing 92b and 93a to connect the armature to field for forward travel polarity, opening 92a in the reverse branch so that faulty operation of 86c cannot cause closure of 91a and 90b to short out the armature; and also closing 92d. On reverse setting of the controller closing 86c, in similar manner energization of 90c, 91c closes 90b and 91a to reverse the motor polarity, 90a is opened in the forward branch again for motor protection against failure of 86b, and 90d is closed.

In the dynamic braking control polarity selecting circuitry, the normally closed contacts 85d are connected between line 81 and the movable contact arm of selector switch 89, the fixed contacts 89a, 89b of which are connected to an end respectively of relay coils 97c, 98c, the opposite ends of which are connected commonly to a point between switch 42b and solenoid 88c, i.e., through 42b and 12 to line 81. Said opposite ends of the relay coils 97c, 98c are respectively connected through the normally open relay contacts 97a and 98a to a point between 92a and 86c, and to a point between 90a and 86b.

Now it may be observed that with the travel controller at any forward or reverse setting, dynamic braking will occur upon depression of pedal S, which opens switch 42a and closes 42b. Opening 42a deenergizes contactor solenoid 85c to open motor power switch 85a, and to close both 85b of the braking circuit and 85d; and deenergizes control branches controlled by 86a–d, releasing whichever contactor set 92b—93a or 91a—90b was just previously involved in driving. Also current is cut off from the solenoid 101c to open 101a, so that resistor 84a is not shunted. Closing 42b (which also starts the power brake hydraulic motor M of pump P by energizing 88c to close 88a), then provides current to the dynamic braking polarity selecting circuit.

Assuming that 86 is at a forward setting, selector switch 89 however is at contact 89a to energize 97c, therefore closing 97a upon closure of 85d. Hence reverse solenoids 90c, 91c are energized to close 90b and 91a, reversing the armature-field polarity as required for dynamic braking of the forwardly moving vehicle. Had the vehicle been driving in reverse when brakes were applied, then switch 89 being set at 89b, contact 98c would be energized to close 98a, hence energizing 92c, 93c to close 92b, 93a for requisite braking polarity. The inclusion of 85d contacts in the selector circuitry, is merely a safeguard against motor field damage, by a failure at unit 42 permitting 42a and 42b to be simultaneously closed, or likewise at 89, which otherwise might cause 90b, 91a, 92b, 93a to be closed simultaneously under some operating conditions or control settings, just as 90a, 92a protect the motor against certain controller element failures.

Hence, for any drive setting of controller 86, the selector switch 89 with relays 97, 98, and switch 42b provide circuitry immediately ready for appropriate dynamic braking setting of contactor switches 90b, 91a, 92b, 93a, upon use of the pedal S, the latter contactor switches therefore serving also as dynamic braking polarity switches. Switch 89 with associated relays 97, 98 likewise may be considered switch means selectively determining motor polarity relations for dynamic braking, upon closure of dominating switch 42b.

Depending upon what mode of operation is desired, the power braking and dynamic braking can be designed to be initiated substantially simultaneously; or for initiation of dynamic braking at a first point of pedal depression, with power braking not beginning until the pedal is depressed somewhat further to move the plunger element from valve "closed" or "off" position. Thus a pin and slot connection between the pedal arm 40 and valve plunger linkage, or the shape of arm 41 in the region serving as an actuating cam for switch unit 42, can be such that the actuation of switch unit 42, opening 42a to initiate dynamic braking and closing 42b to start pump P, occurs at a quite distinct point before movement of the plunger of the power brake control unit, valve 44, occurs to start power braking as well, so that it is readily at the operator's control to use only dynamic braking. Otherwise, with but little further movement of the pedal required to initiate dynamic braking, after valve 44 starts to open, these two braking means are in practical effect initiated simultaneously, though of course with progressive pedal depression and progressive opening of valve 44, the degree or intensity of power braking is increased.

After the valve 44 is wide open, and plunger 44a has travelled its full stroke, further service brake pedal depression—as permitted by the spring linkage—then is communicated through the mechanical linkage to depress lever 21 when stop 69 on rod 67 encounters block 35, thereby causing the mechanical brake to engage. Hence all braking facilities are available at pedal S in a natural safe sequence.

As far as the mechanical parking brake operation is concerned, apart from its operation through the service brake pedal, in normal use when the operator gets into the operating station standing on treadle T, the parking brake is released through the mechanical linkage described, and switch 12 is closed to make power available to the control circuits as noted. When the truck is stopped and the operator leaves his station in the vehicle, the treadle rises to permit the mechanical brake to engage, and switch 12 opens to cut off power from the control circuits. Should the operator leave the platform for any cause while the truck is in motion, then of course the "dead-man" control feature of the brake appears, the brake in like manner being applied to bring the truck to a halt at the same time that opening of switch 12 cuts off power to all the control circuits, thereby cutting off electric power to the motor irrespective of travel controller setting.

We claim:

1. In an industrial truck having an electrical vehicular propulsion motor, drive torque transmitting means between motor rotor and vehicle wheels, and propulsion motor electrical controls for operator selection of vehicle drive direction and speed, a braking system comprising: a mechanical parking brake biased to engaged condition; a dead-man control member connected to the brake for disengaging said brake when an operator is in vehicle driving position; service brakes applying braking force at the vehicle wheels and a service brake pedal for operator control thereof; a movable control element controlling progressive application of the service brakes over a certain range of limited motion thereof; a resilient linkage between said pedal and movable element whereby the pedal advances said movable element through its limited range of motion and thereafter over-rides the said element; means connecting said pedal to said mechanical brake adapted to engage the brake by over-riding pedal motion; an electro-dynamic motor braking circuit; and electro-dynamic brake control means including switch means triggered by brake applying motion of said service brake pedal effective simultaneously to cut off electrical power to said motor and to close said circuit for dynamic braking.

2. In an industrial truck having an electrical vehicular propulsion motor, drive torque transmitting means between motor rotor and vehicle wheels, and propulsion motor electrical controls for operator selection of vehicle drive direction and speed, a braking system comprising: a mechanical parking brake biased to engaged condition for applying braking force to said torque transmitting means; a dead-man control member connected to the brake for disengaging said brake when an operator is in vehicle driving position; service brakes applying braking force at the vehicle wheels and a service brake pedal for operator control thereof; a movable control element controlling progressive application of the service brakes over a certain range of limited motion thereof; an over-riding linkage between said pedal and movable element whereby said movable element is advanced through its limited range of motion by movement of said pedal, and adapted to permit thereafter further pedal motion; means connecting said pedal to said mechanical brake adapted to engage the brake by said further pedal motion; an electric dynamic motor braking circuit; and electro-dynamic brake control means including switch means actuated by brake applying motion of said service brake pedal effective simultaneously to cut off electrical power to said motor and to close said circuit for dynamic braking.

3. In an industrial truck having an electrical vehicular propulsion motor, drive torque transmitting means between motor rotor and vehicle wheels, and propulsion motor electrical controls for operator selection of vehicle drive direction and speed, a braking system comprising: a mechanical parking brake biased to engaged condition for applying braking force to said torque transmitting means; a dead-man control member connected to the brake for disengaging said brake when an operator is in vehicle driving position; switch means actuated by said control member for cutting off electric power to said motor when the operator leaves vehicle driving position; service brakes applying braking force at the vehicle wheels and a service brake pedal for operator control thereof; a movable control element controlling progressive application of the service brakes over a certain range of limited motion thereof; a resilient linkage between said pedal and movable element whereby said movable element is advanced through its limited range of motion by movement of said pedal, and adapted to permit thereafter further pedal motion; means connecting said pedal to said mechanical brake adapted to engage the brake by said further pedal motion; and switch means actuated by initial brake applying motion of said service brake pedal effective to cut off electrical power to said motor.

4. In an industrial truck having an electrical vehicular propulsion motor, drive torque transmitting means between motor rotor and vehicle wheels, and propulsion motor electrical controls for operator selection of vehicle drive direction and speed, a braking system comprising: a mechanical parking brake biased to engaged condition, a dead-man control member connected to the brake for disengaging said brake when an operator is in vehicle driving position; a service brake pedal; a switch unit actuated by initial depression of the pedal and held in actuated condition by a further over-riding depression of the pedal; means connecting said pedal to said mechanical brake adapted to engage the brake at a terminal portion of said further pedal depression; an electro-dynamic motor braking circuit as means for developing in said motor a braking force applied to said torque transmitting means; and electro-dynamic brake control means including said switch unit effective simultaneously to cut off electrical power to said motor and to initiate electro-dynamic braking upon actuation of said unit.

5. A braking system as described in claim 4, including switch means actuated by said control member for cutting off electric power to said motor when the operator leaves vehicle driving position.

6. In an industrial truck having an electrical vehicular propulsion motor, drive torque transmitting means between motor rotor and vehicle wheels, and propulsion motor electrical controls for operator selection of vehicle drive direction and speed, a braking system comprising: a mechanical parking brake biased to engaged condition, a dead-man control member connected to the brake for disengaging said brake when an operator is in vehicle driving position; service brakes applying braking force at the vehicle wheels and a service brake pedal for operator control thereof; a movable element controlling application of the service brakes; a resilient linkage between said pedal and movable element whereby said element is advanced to a service brake applying position by initial movement of said pedal, and adapted to permit thereafter further pedal motion; means connecting said pedal to said mechanical brake adapted to engage the brake in a terminal range of said further pedal motion; an electric dynamic motor braking circuit; and electric dynamic brake control means including switch means actuated by brake applying motion of said service brake pedal effective simultaneously to cut off electrical power to said motor and to close said circuit for dynamic braking.

7. In an industrial truck having an electrical vehicular propulsion motor, drive torque transmitting means between motor rotor and vehicle wheels, and propulsion motor electrical controls for operator selection of vehicle drive direction and speed, a braking system comprising: a mechanical parking brake biased to engaged condition, a dead-man control member connected to the brake for disengaging said brake when an operator is in vehicle driving position; hydraulically powered service brakes applying braking force at the vehicle wheels, a service brake pedal for operator control thereof, and an electrically energized source of hydraulic power for said brakes; a movable control element controlling progressive application of the service brakes over a certain range of limited motion thereof; a resilient linkage between said pedal and movable element whereby said movable element is advanced through its limited range of motion by movement of said pedal, and adapted to permit thereafter further pedal motion, means connecting said pedal to said mechanical brake adapted to engage the brake in a terminal portion of said further pedal motion; an electro-dynamic motor braking circuit; and electro-dynamic brake control means including switch means actuated by brake applying motion of said service brake pedal effective simultaneously to cut off electrical power to said motor to close said circuit for dynamic braking, and to energize said source of hydraulic power.

References Cited in the file of this patent

UNITED STATES PATENTS

| | | |
|---|---|---|
| 1,121,786 | Barnum | Dec. 22, 1914 |
| 1,440,500 | Simmon et al. | Jan. 2, 1923 |
| 1,880,958 | Farmer | Oct. 4, 1932 |
| 2,327,809 | MacDonald et al. | Aug. 24, 1943 |
| 2,368,726 | Piron | Feb. 6, 1945 |
| 2,395,323 | Framhein | Feb. 19, 1946 |
| 2,484,213 | Fitzgerald | Oct. 11, 1949 |
| 2,790,513 | Draxler | Apr. 30, 1957 |